3,336,341
11-OXYGENATED B-NORTESTOSTERONE
DERIVATIVES
Louis R. Fare, Willingboro, and Kenneth G. Holden, Stratford, N.J., and Joseph R. Valenta, Philadelphia, Pa., assignors to Smith Kline & French Laboratories, Philadelphia, Pa., a corporation of Pennsylvania
No Drawing. Filed Mar. 10, 1964, Ser. No. 350,642
9 Claims. (Cl. 260—348)

This invention relates to novel 11-oxygenated B-norsteroid derivatives and to methods for preparing them. These compounds have utility as pharmacodynamic agents, such as central nervous system depressants, more specifically as sedatives, and as agents affecting the endocrine system, such as antiandrogenic agents. They are also useful for preparing other B-norsteroids having similar therapeutic utilities.

More specifically, the end compounds of this invention are illustrated by the following structural formula:

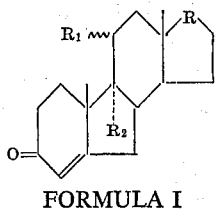

FORMULA I in which R is

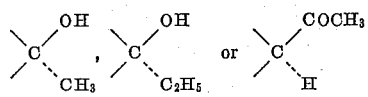

$R_1$ is α-hydroxyl, β-hydroxyl or taken together with the carbon atom to which it is attached, keto; and $R_2$ is hydrogen or halo such as chloro, bromo, fluoro.

The 11α-hydroxyl group is inserted into 17α-methyl, ethyl or ethinyl-B-nortestosterone and B-norprogesterone (U.S. Patent No. 3,072,681) by biotransformation using whole cells of a fungus of the genus Trichothecium (see U.S. Patent No. 2,925,366 for examples of species), the order Mucorales (see U.S. Patent No. 2,671,096 for species) or the species Aspergillus ochraceus (U.S. Patent No. 2,802,775). The preferred species are *Trichothecium roseum* or *Rhizopus arrhizus*. Details of the use of these species are given in the examples.

The general conditions of the fermentation method of this invention are as follows. The fermentation inocula are grown in 100 ml. of medium in 500 ml. Erlenmeyer flasks on a rotary shaker at 200 r.p.m. and ambient temperature, 200 ml. of inoculum is used per 10 liters of fermentation medium.

The media used are liquid media providing assimilable sources of nitrogen and/or carbon. Additives variously used are corn steep liquor, peanut meal, fish meal distillers dried solubles, coconut oil meal, Edamine, Trypticase soy broth, dextrose, etc. The fermentations are carried out in stir jars of New Brunswick Fermentation Units with a constant water bath temperature of 28–30° C. under aeration and agitation usually in the presence of a standard antifoam agent.

The substrate is dissolved in an organic solvent not detrimental to the fermentation such as ethanol and added beneath the surface of the fermentation medium usually after 24–48 hours growth of the selected organism. The production of the product is monitored to judge subsequent additions of substrate. The progress of the biotrans formation of the steroid substrate during the fermentation is followed by thin layer chromatography on aliquots removed aseptically from the fermentation mixture. The aliquots are extracted with methyl isobutyl ketone or another water immiscible organic solvent. 5λ of the solvent extract is applied to silica gel-G plates. After development by a suitable solvent, the plates are dried and sprayed with a 40% sulfuric acid solution followed by heating with a hot air gun (min. temp. 500° C.). The developed spots are visible under white light or by fluorescent under ultraviolet light.

Following the fermentation the products are isolated by broth clarification by centrifugation or filtration followed by extraction of the thus separated solids then extraction of the combined solid extract and broth with a suitable water-immiscible organic solvent such as methylene chloride. The extract material is then purified by recrystallization or chromatography such as over an alumina or silica gel column.

The schematic process of this invention is illustrated hereafter:

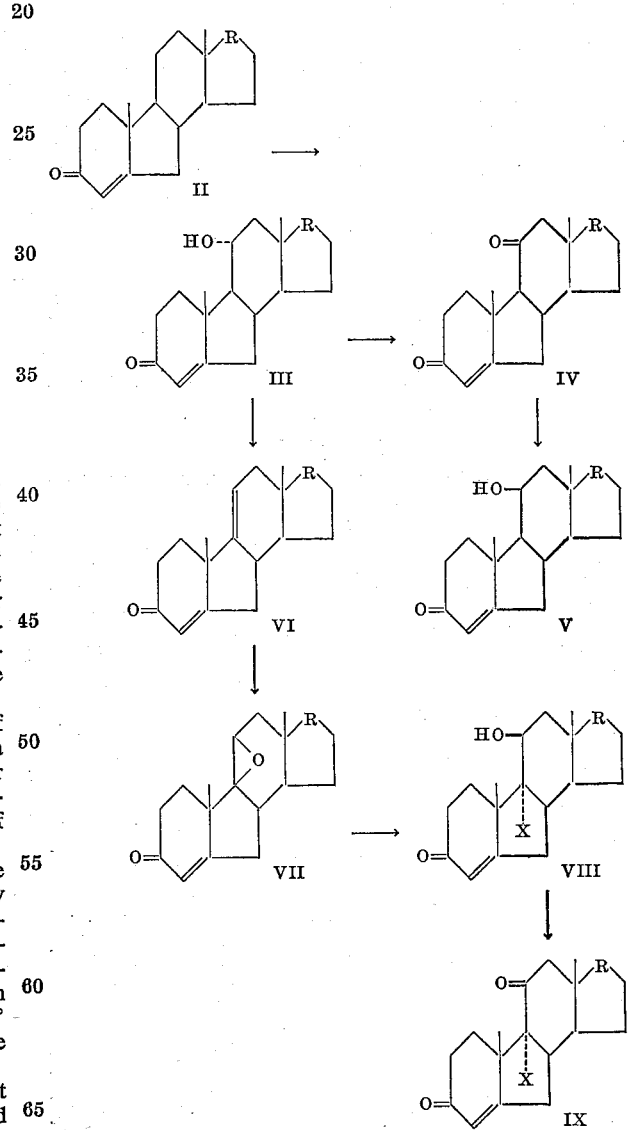

in which R is an herebefore described; X is halo.

The 11α-hydroxy-B-norsteroids (III) are oxidized with chromic acid in a suitable solvent such as acetone-chloroform in the cold such as from about 0–10° C. to produce the 11-oxo compounds (IV). Reduction of the 11-keto group of the 11-keto-17α-alkyl-B-nortestosterones

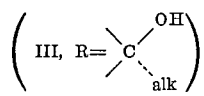

in turn with lithium aluminum hydride gives 3β,11β,17β-trihydroxy-17α-alkyl-B-norandrost-4-ene which is oxidized at position 3 with 2,3-dichloro-5,6-dicyanobenzoquinone to 11β-hydroxy-17α-alkyl-B-nortestosterone (V).

Also, the 11α-hydroxy cogeners (III) are dehydrated by forming the tosylate using p-toluenesulfonyl chloride in pyridine then decomposing in the presence of base such as with a mixture of lithium chloride and lithium carbonate in a suitable solvent such as dimethylformamide to give $\Delta^{9,11}$-17α-alkyl-B-nortestosterone (VI). This compound is converted to the 9,11-epoxide (VII) via the bromohydrin. The epoxide is reacted with hydrogen fluoride or chloride to form the important 9α-halo-11β - hydroxy - 17α - alkyl - B - nortestosterone derivatives (VIII) which are important antiandrogenic agents.

If desired the halohydrin can be oxidized at C-11 with chromic acid to give 11-oxo-9α-fluoro-17α-alkyl-B-nortestosterone (IX). Also the acyl derivatives of the hydroxy compounds described can be used if desired, such as the acylates derived from pharmaceutically acceptable carboxylic acids of less than 12 carbon atoms. These derivatives are prepared by heating the hydroxyl derivative with an excess of an acyl anhydride. The term "alkyl" is used to denote lower alkyl chains of 1 to 4 carbon atoms, preferably methyl and ethyl.

It is believed that this description and the following illustrative examples will make this invention operative and apparent to those skilled in the art. Other variations obvious to those skilled in the art will be apparent, such as extending certain of these reactions to the B-norprogesterone series, i.e., those compounds where R contains a 17β-acetyl group. The B-norprogesterones have sedative and/or progestational activity. Such modifications are included in the ambit of this invention.

*Example 1*

The fermentation medium is comprised of 10 liters of 2% corn steep liquor adjusted to pH 6.5 with sodium hydroxide which has been autoclaved for two hours at 15 p.s.i. at 121° C. The fermentation is carried out in stir jars with a water bath temperature of 28–30° C. at an aeration rate of 3 liters of air per minute per 10 liters of medium. The impeller speed is 200 r.p.m. The inoculum is prepared using *Rhizopus arrhizus* ATCC 11145 by standard procedures. Five grams of 17α-methyl-B-nortestosterone in 50 ml. of 95% ethanol is added to the medium below its surface after 48 hours growth—1 g. after 48 hours, 2 g. after 55 hours, 1 g. after 72 hours and 1 g. after 78 hours. The fermentation is terminated 24 hours after the last substrate addition.

The solids are removed by centrifugation. The effluent broth is clarified further by filtration. The collected matter is washed with 1 liter of ethanol which is added to the aqueous phase.

The aqueous broth is extracted exhaustively with methylene chloride. The dried organic extract is evaporated in vacuo at 50° C. The residue is taken into benzene and passed over a neutral alumina column (Woelm, III). Elution with increasing amounts of methylene chloride to pure methylene chloride to methanol in methylene chloride gives 6β-hydroxy-17α-methyl-B-nortestosterone, M.P. 196–199° C., 6α-hydroxy-17α-methyl-B-nortestosterone, M.P. 200–201° C., and 11α-hydroxy-17α-methyl-B-nortestosterone, M.P. 202–205° C.

*Example 2*

A fermentation medium is prepared using 20 g. of Edamine enzymatic digest of lactalbumin (Sheffield Co.), 50 g. of commercial dextrose (cerelose), 5 g. of corn steep liquor and water to one liter. Ten liters of medium is adjusted to pH 6.3–6.5 with sodium hydroxide then autoclaved 1½ hours at 15 p.s.i. at 121° C. The fermentation is carried out as above with an aeration rate of 5 liters of air per minute per 10 liters with an impeller speed of 200 r.p.m. The medium is inoculated with prepared *Trichothecium roseum* ATCC 12543 and fermented for 48 hours. The cells from 10 liters of medium are collected by centrifugation, washed with distilled water and suspended in 10 liters of 0.1 M. trishydroxymethylamino methane buffer (pH 9.0) then returned to a stir jar. Concentrated sterile glucose solution is added to 0.5% concentration.

The aeration rate for bioconversion is 4 liters of air per minute per 10 liters of buffered suspension at 250 r.p.m. 17α-methyl-B-nortestosterone solution in 95% ethanol (1 g./10 ml.) is added as follows; 2.5 g. at once, 2.5 g./10 liters after 18 hours, 2.5 g. after 42 hours to a total of 52 g. of substrate. Sterile glucose is added to keep the concentration at 0.5%. The fermentation is terminated 65 hours after the last addition of substrate.

Following fermentation the cells are separated. Extraction of the cells and broth separately is carried out with methylene chloride as in Example 1 to give a crude residue after evaporation. This is treated with boiling acetone. The insoluble material is separated and recrystallized from chloroform-methanol to give 15α-hydroxy-17α-methyl-B-nortestosterone (21%).

The acetone soluble fraction is evaporated and the residue chromatographed over neutral alumina (Woelm, III). Elution with benzene-methylene chloride gives 6α-hydroxy-17α-methyl-B-nortestosterone (4%). Elution with methylene chloride and methylene chloride-methanol gives a solid which is purified by recrystallization from acetone-hexane to give 11α-hydroxy-17α-methyl-B-nortestosterone, M.P. 202–205° C.

Substituting as substrate B-norprogesterone or 17α-ethynyl-B-nortestosterone gives 11α-hydroxy-B-nor- progesterone and 11α-hydroxy-17α-ethynyl B-nortestosterone, respectively.

*Example 3*

To a solution of 4.0 g. of 11α-hydroxy-17α-methyl-B-nortestosterone in a mixture of acetone (75 ml.) and chloroform (25 ml.) is added 6.8 ml. of standard chromic acid (26.72 g. of chromium trioxide, 23 ml. of sulfuric acid, water to 100 ml.). The addition is carried out over a one-minute period while the reaction mixture is stirred and maintained at 0° C. Stirring is continued for two minutes after the addition is complete. The reaction mixture is then poured into cold water which is extracted three times with methylene chloride. Evaporation of the combined and dried extracts gives a crude product which is purified by crystallization from acetone-hexane. The pure product melts at 164–165° C. after sublimation and is 11-oxo-17α-methyl-B-nortestosterone.

*Example 4*

To a stirred mixture of 1.25 g. of lithium aluminum hydride and 50 ml. of ether is added a solution of 2.5 g. of 11-oxo-17α-methyl-B-nortestosterone in 20 ml. of tetrahydrofuran. The addition is carried out dropwise at 0° C. under nitrogen. The reaction mixture is allowed to warm to room temperature and is then heated at reflux for two hours. After cooling to 0° C., the reaction mixture is treated cautiously with 5 ml. of water with rapid stirring. The white precipitate which forms is removed by filtration, and the filtrate is evaporated to dryness. The crystalline residue, crude 3β,11β,17β-trihydroxy-17α-methyl-B-norandrost-4-ene, is used in the next reaction without purification.

The 3.65 g. of crude triol is dissolved in 25 ml. of dioxane and treated with a solution of 2.27 g. of 2,3-dichloro-5,6-dicyanobenzoquinone in 25 ml. of dioxane. After standing for 18 hours at 25° C. the reaction mixture is evaporated to dryness. The residue is dissolved in chloroform-methanol (9:1) and poured through a column of 60 g. of activity III Woelm alumina. The filtrate is evaporated to dryness and recrystallized from methanol-acetone to give 11β-hydroxy-17α-methyl-B-nortestosterone, M.P. 253–258° C.

This material (200 mg.) is dissolved in 10 ml. of acetic anhydride and heated at reflux for one hour to give the 11,17-diacetate.

Example 5

To a solution of 0.70 g. of 11α-hydroxy-17α-methyl-B-nortestosterone in 10 ml. of pyridine is added 0.70 g. of para-toluenesulfonyl chloride in 5 ml. of pyridine. After standing at 25° C. for 18 hours, the reaction mixture is poured into water and extracted three times with methylene chloride, the organic extracts being washed with cold dilute phosphoric acid. Evaporation of the combined and dried extracts gives a crude tostylate which is purified by crystallization from acetone-hexane. The purified product is 11α-tosyloxy-17α-methyl-B-nortestosterone, M.P. 185–186° C.

A mixture of 0.30 g. of the tosylate, 0.3 g. of anhydrous lithium chloride, and 0.3 g. of lithium carbonate suspended in 5 ml. of dimethylformamide is refluxed under a nitrogen atmosphere with stirring for two hours. The cooled reaction mixture is poured into dilute sodium carbonate solution and extracted with benzene. Drying and evaporation of the combined benzene extracts gives a crude product which after crystallization from acetone-hexane and sublimation melts at 187–189° C., Δ⁹,¹¹-17α-methyl-B-nortestosterone. This compound has antiandrogenic activity.

Example 6

Δ⁹,¹¹-17α-methyl-B-nortestosterone (1.0 g.) in 12 ml. of acetone at 0° C. is treated with 0.74 g. of N-bromosuccinimide and 3 ml. of aqueous perchloric acid (2%) with stirring. After stirring at 0° C. for 40 minutes, 1.3 ml. of allyl alcohol is added to decompose excess N-bromosuccinimide and the reaction mixture is poured into aqueous sodium bicarbonate solution. The aqueous mixture is extracted with methylene chloride and, after washing with aqueous sodium sulfite solution, the combined organic extracts are dried and evaporated to a residue. This crude product is recrystallized from acetone-hexane to give 9β,11β-epoxy-17α-methyl-B-nortestosterone, M.P. 162–164° C.

If base is avoided during the workup the intermediate 9α - bromo-11β-hydroxy-17α-methyl-B-nortestosterone is optionally isolated.

The epoxy compound (3.5 g.) is dissolved in 20 ml. of alcohol free chloroform and cooled to —70° C. This solution is added to a mixture of hydrogen fluoride (10 ml.), tetrahydrofuran (10 ml., freshly distilled from calcium hydride) and chloroform (10 ml.) at —70° C. with stirring.

The reaction mixture is then allowed to warm to —15° C. and is maintained at this temperature for six hours. After pouring the reaction mixture into excess cold sodium bicarbonate solution it is extracted with chloroform, dried and evaporated to a residue. The crude product is purified by column chromatography and finally by crystallization from methylene chloride-ether to give 9α-fluoro-11β-hydroxy-17α-methyl - B - nortestosterone, M.P. 183–185° C., a potent antiandrogenic agent.

This material (500 mg.) is heated with an excess of acetic anhydride at reflux to give the diacetate derivative.

Reacting the epoxy intermediate (1 g.) with hydrogen chloride at 0° C. gives 9α-chloro-11β-hydroxy-17α-methyl-B-nortestosterone.

Example 7

A solution of 750 mg. of 9α-fluoro-11β-hydroxy-17α-methyl-B-nortestosterone in chloroform-acetone at 0° C. is mixed with a slight excess of standard chromic acid solution. Quenching in water and extraction with methylene chloride gives the desired 11-oxo-9α-fluoro-17α-methyl-B-nortestosterone.

Example 8

17α-ethyl-B-nortestosterone, 17α - ethynyl B-nortestosterone and B-norprogesterone are equivalently substituted in the fermentation reactions of Examples 1 and 2. The chemical reactions of Examples 3–7 are fully applicable to 11β-hydroxy-17α-ethyl-B-nortestosterone as well as to 11β-hydroxy-B-norprogesterone with the exception of the reduction described in Example 4.

What is claimed is:

1. A chemical compound of the structure:

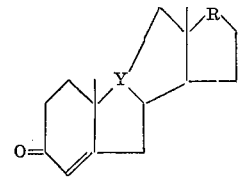

in which R is a member selected from the group consisting of

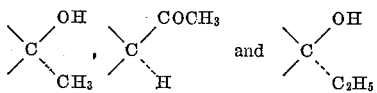

and Y is a member containing an 11-oxygenated carbon and selected from the group consisting of

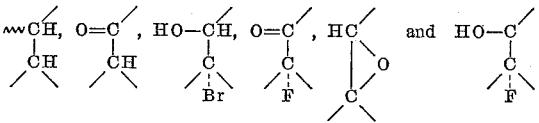

2. 11α-hydroxy-17α-methyl-B-nortestosterone.
3. 11β-hydroxy-17α-methyl-B-nortestosterone.
4. 11-oxo-17α-methyl-B-nortestosterone.
5. Δ⁹,¹¹-17α-methyl-B-nortestosterone.
6. 9α-fluoro - 11β - hydroxy-17α-methyl-B-nortestosterone.
7. 11α-tosyloxy-17α-mehtyl-B-nortestosterone.
8. 3β,11β,17β-trihydroxy - 17α - methyl-B-norandrost-4-ene.
9. 9β,11β-epoxy-17α-methyl-B-nortestosterone.

References Cited

UNITED STATES PATENTS

| | | | |
|---|---|---|---|
| 2,678,933 | 5/1954 | Meister | 260—397.45 |
| 2,950,289 | 8/1960 | Weisenborn | 260—456 X |
| 3,012,941 | 12/1961 | Wettstein et al. | 167—74 |

FOREIGN PATENTS 806,045　12/1958　Great Britain.

CHARLES B. PARKER, *Primary Examiner.*

FLOYD D. HIGEL, *Assistant Examiner.*